US00RE50662E

(19) United States
(12) Reissued Patent
Hale et al.

(10) Patent Number: US RE50,662 E
(45) Date of Reissued Patent: Nov. 18, 2025

(54) COMPACT HIGH FIDELITY REEL

(71) Applicant: CABLE RETRACTORS LLC, Cheney, WA (US)

(72) Inventors: John Arthur Hale, Cheney, WA (US); Phillip Andrew Hale, Cheney, WA (US)

(73) Assignee: Cable Retractors LLC, Cheney, WA (US)

(21) Appl. No.: 17/714,960

(22) Filed: Apr. 6, 2022

Related U.S. Patent Documents

Reissue of:
(64) Patent No.: 10,633,219
Issued: Apr. 28, 2020
Appl. No.: 15/457,794
Filed: Mar. 13, 2017

U.S. Applications:
(60) Provisional application No. 62/307,294, filed on Mar. 11, 2016.

(51) Int. Cl.
*B65H 75/44* (2006.01)
*B65H 75/14* (2006.01)
*B65H 75/40* (2006.01)
*B65H 75/48* (2006.01)

(52) U.S. Cl.
CPC ..... *B65H 75/4434* (2013.01); *B65H 75/14* (2013.01); *B65H 75/406* (2013.01); *B65H 75/4449* (2013.01); *B65H 75/486* (2013.01); *B65H 2701/3919* (2013.01)

(58) Field of Classification Search
CPC ..... H01H 3/0226; H01H 2013/525; H01R 13/72; H01G 11/02
USPC ..... 439/501; 200/61.18; 191/12.2 R, 12.4
See application file for complete search history.

(56) References Cited

U.S. PATENT DOCUMENTS 2,646,693 A * 7/1953 Rexroad ..... H01H 3/0226 74/500.5
5,101,082 A * 3/1992 Simmons ..... B65H 75/4471 200/61.15
5,590,749 A * 1/1997 Wagner ..... H02G 11/02 191/12.4
2015/0102151 A1* 4/2015 Skowronski ..... H02G 11/02 242/394

* cited by examiner

*Primary Examiner* — William C Doerrler
(74) *Attorney, Agent, or Firm* — Richard T. Black; FisherBroyles, LLP

(57) ABSTRACT

A retractable cord reel houses contacts that connect autonomously when the user aligns the spool to lock it from retracting. The spool and housing contains high quality, sensitive contacts for high speed data and other critical signals that engage when indexed by the user. The design is flexible for adaptation to a variety of applications and scalable based on cable type and length as well as the number of contacts required. The contacts are engaged when the user allows an indexing dog to engage a spool indexing housing causing the dog to shift and force a mating lever to make the electrical connection. Decoupling occurs instantly when the spool is slightly rotated by the user. The user's only action throughout the process is to pull the cable. Without this intentional action of the user, the spool, rotates freely and the contacts are not engaged.

14 Claims, 5 Drawing Sheets

COMPACT HIGH FIDELITY REEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

This application claims priority to U.S. Provisional Patent Application Ser. No. 62/307,294 filed Mar. 11, 2016, which is incorporated herein by reference in its entirety.

FIELD OF THE INVENTION

The present invention relates to cable retraction apparatuses and more specifically cable reels for cable management in power, data, audiovisual and other environments.

BACKGROUND OF THE INVENTION

Over the years, cables and wires of various types and applications have been stored or managed using spools and reels of various designs. The criticality of the design is driven by the need and solving particular problems unique to that need. The basic goal is to wind up unneeded cable onto, or unwind needed cable from, a spool or some other cylindrical device while still keeping the cable's functionality. The end result is retained quality of the cable, kink and tangle free, and readily moved or stored.

Known cable reels have various designs. One type has a cable that is contiguous throughout the device from end to end. It simultaneously connects to the two communicating devices and winds up on a reel placed in the middle. The two ends extend and retract at the same time. This design concept keeps a large percentage of the cable available for utilization by the user. A downside of this reel design is the presence of a reel in the middle of the length of cable.

A second design also includes a single, contiguous cable, but it wraps and unwraps in a single housing that remains stationary and the useable cable extends out of only one side. This is accomplished by utilizing two spools and requires a significant amount of cable retained in the housing that wraps up on a second reel while a lesser amount of the useable cable unwraps for use. This design is limiting for applications where length of cable affects the integrity of the signal carried by the cable. Also, the second spool adds size and complexity to the device.

In the two previous designs, connectivity is the responsibility of the cable manufacturer. Other devices tackle the problem of reeling cables that are not contiguous and thus must be connected and disconnected using a proprietary mechanism. There are two basic mechanisms for accomplishing this task. The first involves a locking device that uses a lever and latch system that is manually activated. The lever that is manually activated contains contacts that are separated and reconnected when retraction or extension is desired. While variations of this device can be developed for multiple applications, the design does not lend itself to use in applications where high quality, very precise and high integrity connections are mandatory. Furthermore, manual manipulation limits its application.

Yet another known design involves axial movement of the spool to accomplish the connect/disconnect function prior to spool rotation. One example of this design uses manual manipulation to facilitate the axial movement and uses its own, internally housed contacts. This design has limited scalability, introduces possible signal errors due to the poor quality of the connection and the same application constraints previously mentioned with a manually manipulated device.

The second design using axial movement for accomplishing the connect/disconnect function is only using that movement to provide connect/disconnect forces between standard connectors. This is a purpose built device working in the telecommunications industry using optical cabling. This design is large and cumbersome for most applications.

Lastly, another solution uses a hybrid means of continuity where the cable is not contiguous, but it maintains a constant connection during spool movement through the use of brushes or brush-like contacts. This type of devices is typically used where signal quality or connectivity is not critical. Examples of these include power cables in industrial shops.

Accordingly, there is needed a compact, reliable, high fidelity cable reel.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. The terms "reel", "retractor" and "retractable reel" are used interchangeably in this application and are intended to have the identical meaning.

In accordance with a preferred embodiment of the present invention, a retractable cable reel houses contacts that connect autonomously when the user aligns a spool to lock it from retracting. The spool and housing preferably comprise high quality, sensitive contacts for high speed data and other critical signals that engage when indexed by the user. The retractable reel is flexible for adaptation to a variety of applications and scalable based on cable type and length as well as the number of contacts required or preferred. The contacts are engaged when the user allows an indexing dog to engage a spool indexing housing causing the dog to shift and force a mating lever to make the electrical connection. Decoupling occurs instantly when the spool is slightly rotated by the user. The user's only action throughout the process is to pull the cable. Without this intentional action of the user, the spool rotates freely and the contacts are not engaged.

Figure 1:
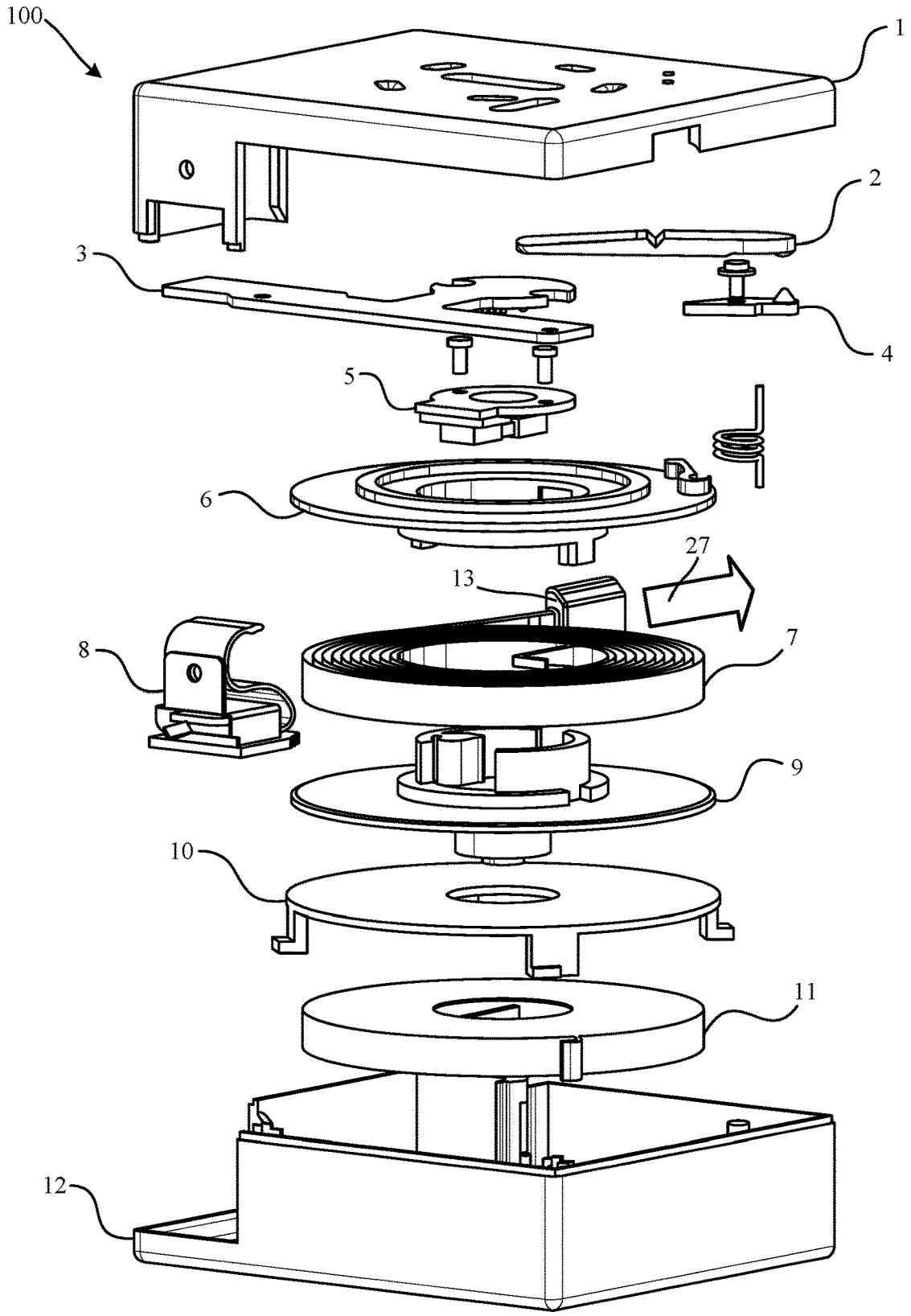
FIG. 1 is an exploded view illustrating a cable retractor according to a preferred embodiment of the present invention.
Figure 2:
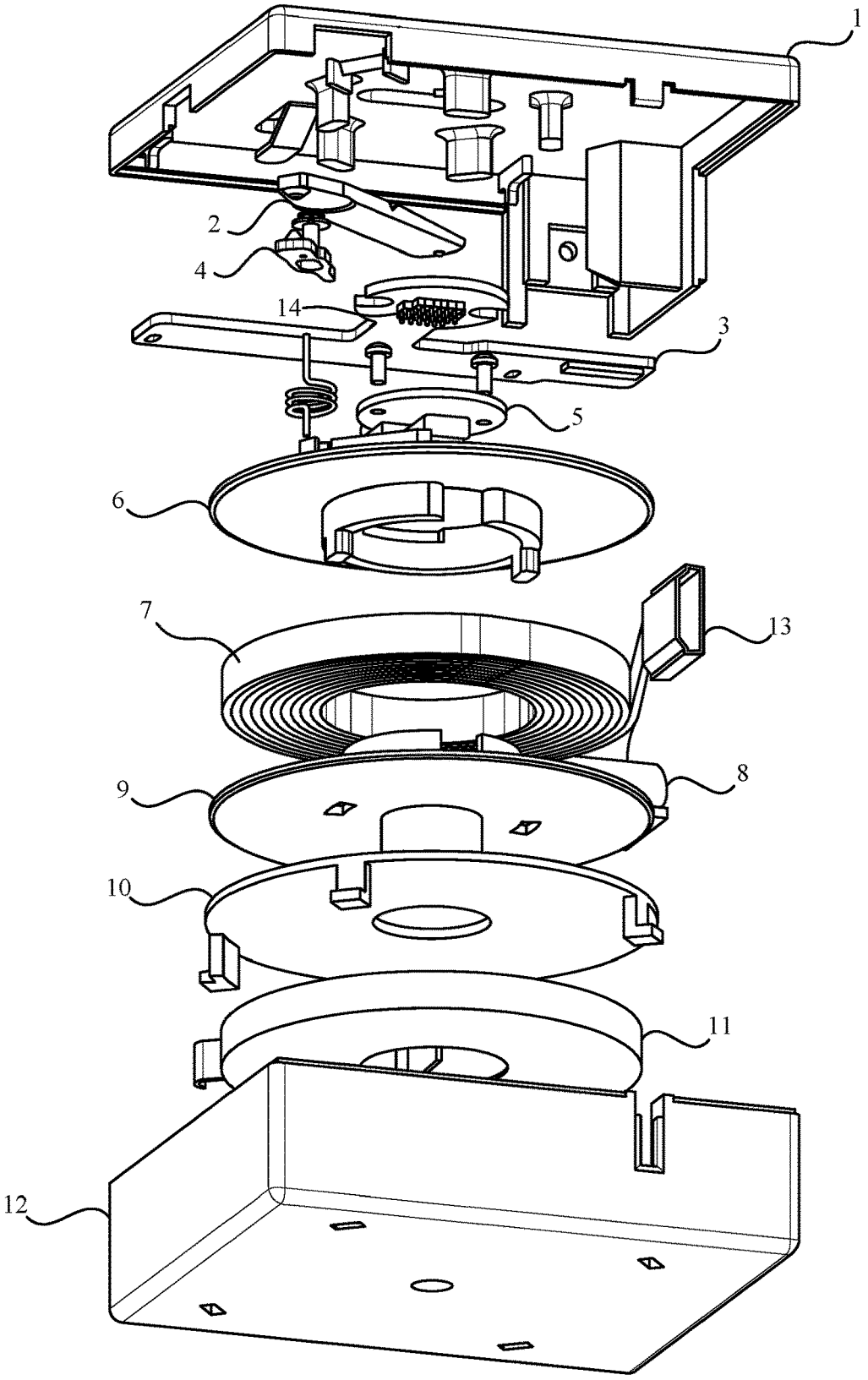
FIG. 2 is yet another exploded view illustrating the cable retractor of FIG. 1.
Figure 3:
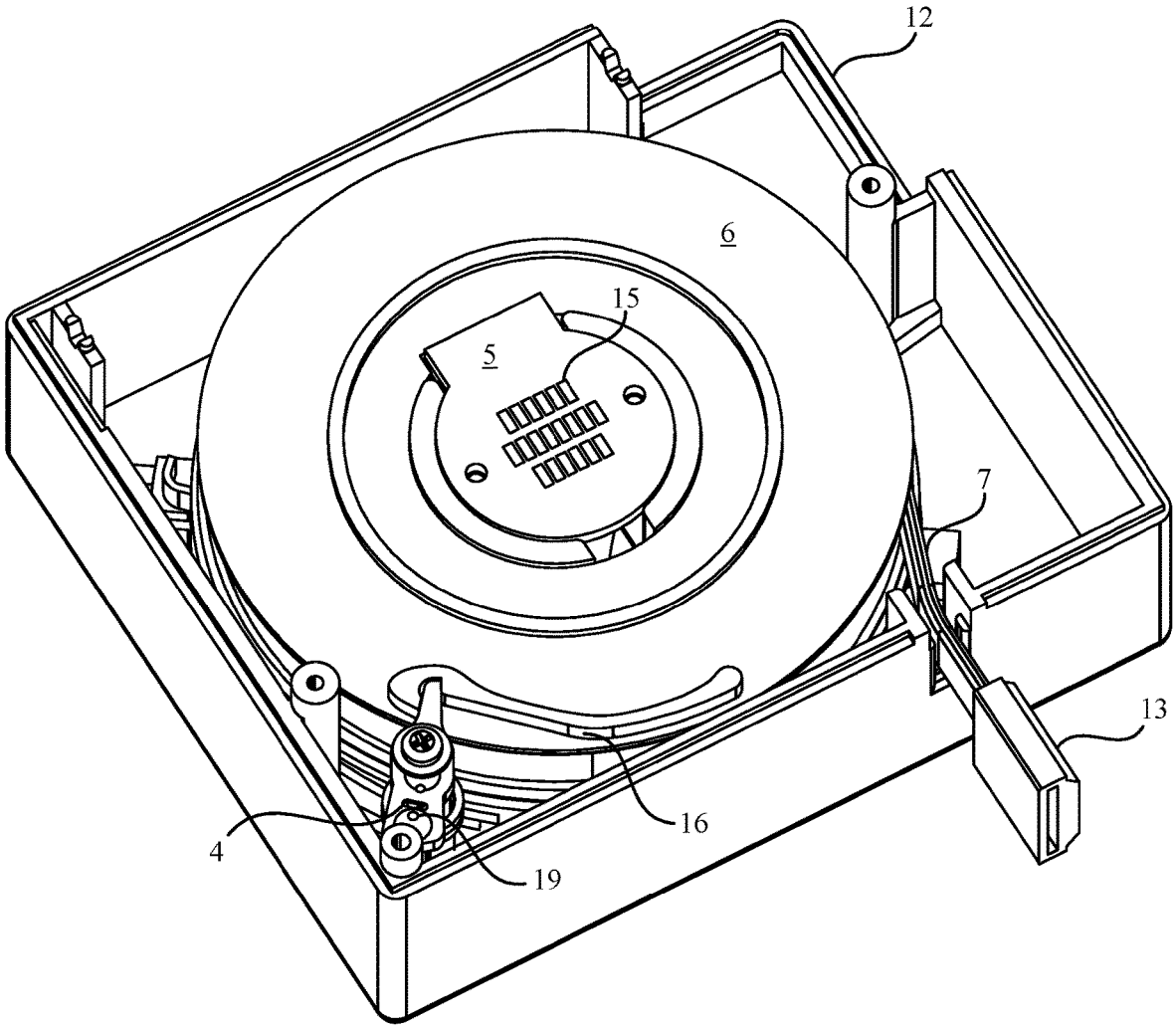
FIG. 3 is a perspective view of a lower portion of the cable retractor.
Figure 4:
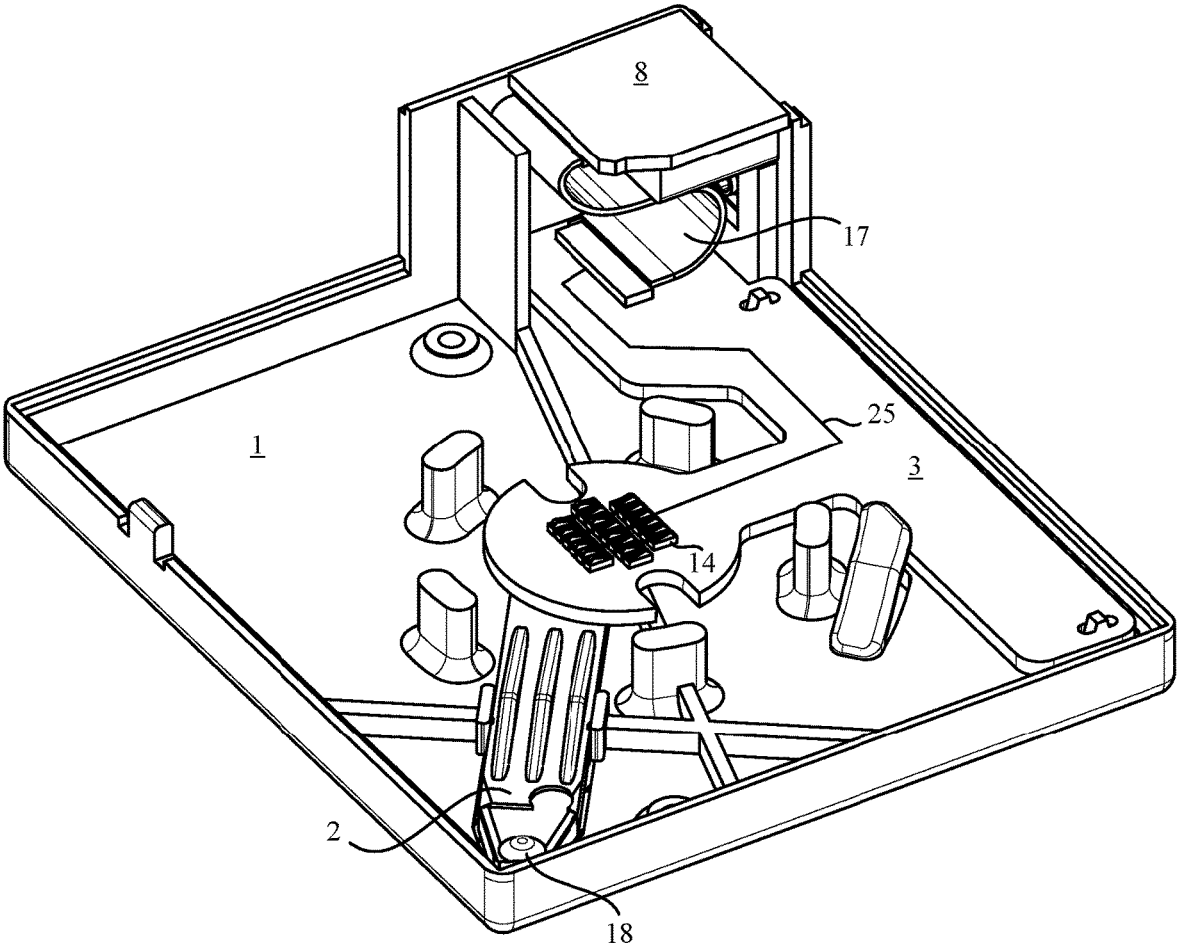
FIG. 4 is a perspective view of an upper portion of the cable retractor; and, FIG. 5 is a partial cut-away view of the cable retractor.
Figure 5:
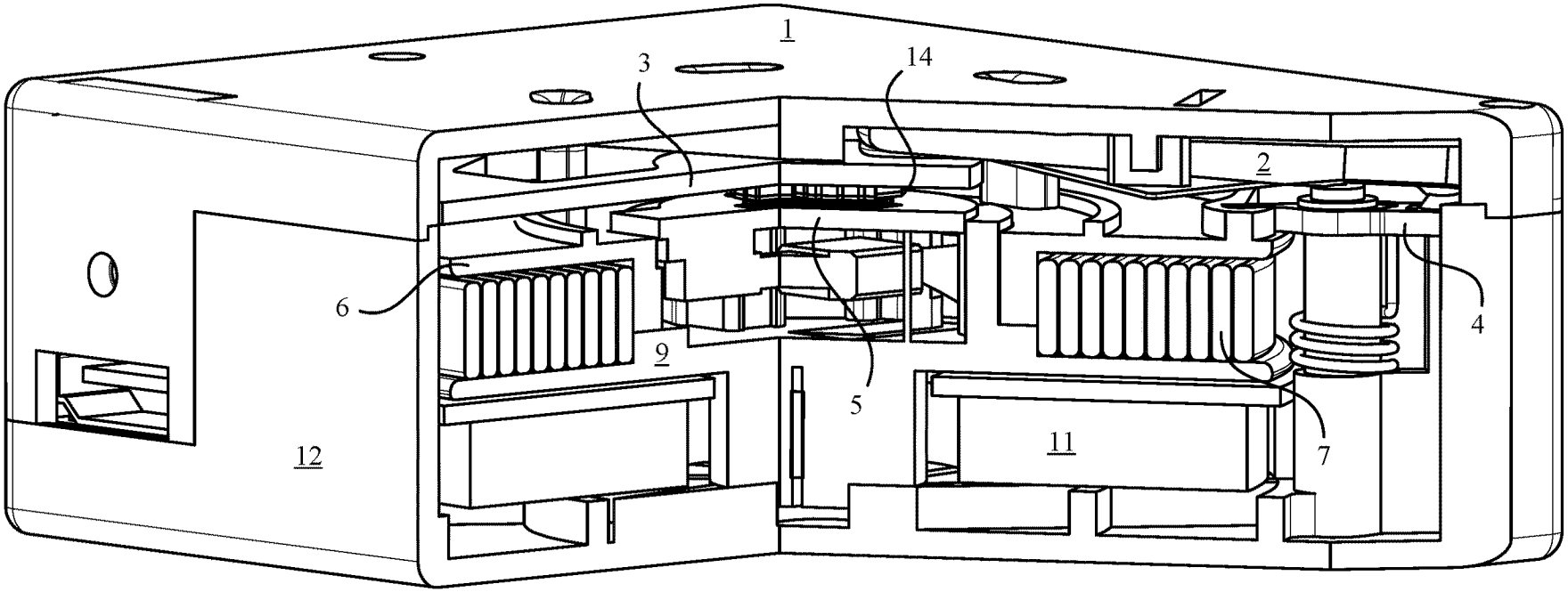

As illustrated in FIG. 1, a cable reel 100 is provided that is flexible enough to accommodate cable management applications of a wide variety of types, lengths and installations maximizing efficiency in materiel and signal quality. The cable reel 100 includes all or some of the features to be further discussed herein. It uses high quality contacts and electrical or electronic circuits or circuitry, such as, for example, printed circuit boards (PCBs) to provide substantially complete and unfettered pass through of tuned high speed, high integrity signals to/from communication, telecommunication, audio visual and other technologically advanced devices.

As discussed below and illustrated in the various drawings (see FIGS. 1-5), the cable reel 100 according to a preferred embodiment, is compact, simple and efficient in that it uses a small number of parts. A spool 6, 9 houses cable assembly 7 that starts at spool PCB 5 and terminates at the user end with a connector 13. The spool 6, 9 houses the spool PCB 5 at the center of rotation and interacts with a powerspring 11 that is the force for retracting the cable 7 once extended. Cover housing 1 of the device 100 preferable encloses stationary PCB 3 that contains contacts 14 that are lowered onto contact pads 15 located on the spool PCB 5 during the connect phase of operation.

When the spool 6, 9, preferable comprising upper spool half 6 and lower spool half 9, is properly aligned and the contacts 14 on the stationary PCB 3 are engaged in electrical contact with the pads 15 on the spool PCB 5, the spool 6, 9 is locked into place and kept from moving. The contacts 14 provide complete continuity by bridging the gap between the two PCBs 3, 5 so the cable 7 can act as if no break in electrical continuity exists between the cable end connector 13 and connector 8 mounted on the cover housing 1. The user accomplishes this simply by pulling on the cable 7 to extend it and providing slack in it when the alignment conditions exist. To release the spool 6, 9 and free it up to retract, the contacts 14 and pads 15 separate and the indexing function is disabled. The mechanism for release is precise and sensitive creating an immediate disconnect with little to no residual movement while in the connected configuration. The user need only to pull on the cable 7 to initiate the disconnect operation. Retraction from that point is free and unhindered.

One feature of the cable reel 100 according to an embodiment is the indexing and mating process and how it is accomplished without lateral loads being imparted on the contacts 14, pads 15 or the PCBs 3, 5. Connection from an external device to the cable reel 100 at its mounting in the installation is facilitated through connector 8 mounted in the cover housing 1, of the reel 100. The external end of the retractable cable 7 plugs directly into the receiver device via standard connector 13.

Variables aspects of device 100, include for example, the overall dimensions of the device 100, the spool size, PCB sizes and shapes, and the number of connections being facilitated by the two PCBs 3, 5 (i.e., the number of contacts 14, 15). The cable length is also a variable and most likely will be a driver affecting the spool 6, 9 and device 100 overall sizes. The cable 7 also dictates the number of connections to be made.

The cover housing 1 contains the stationary PCB 3 upon which the high quality, extremely sensitive contacts 14 are attached. According to one embodiment, a connector 8 is attached to the stationary PCB to which an external source device can be plugged in to the cable reel 100. In accordance with another embodiment, the connector 8 is connected to the stationary PCB 3 via a ribbon cable 17 (FIG. 4) or other suitable electrical wiring component. Electrical conductors, such as PCB traces, illustrated as representative line 25 in FIG. 4, connect ribbon cable 17 to contacts 14. Mating lever 2 is also attached to the cover housing 1 and in such a manner that it can interface with the stationary PCB 3 providing the force to bring the contacts 14 toward the pads 15 on the spool PCB 5 resulting in a complete, effective electronic connection between the two.

According to one embodiment of the present invention 100, the upper spool half 6 is designed to interface with the cover housing 1 to support and assure proper rotation of the spool 6, 9. It also has an index housing 16 designed as part of the upper side that is critical to assuring proper alignment of the PCBs 3, 5 and locking the spool 6, 9 from rotating while connected.

According to one embodiment of the present invention 100, the lower spool half 9 contains the mounting surface for the spool PCB 5 and cable 7 assembly as well as the reel location for the cable storage. As with the electrical connections discussed previously with regard to ribbon cable 17 and contacts 14, pads 15 and cable 7 are electrically coupled via conductors, such as PCB traces on PCB 5 (not shown in the figures for reasons of clarity. The lower side of the lower spool half 9 is designed with an arbor protrusion for interfacing with the powerspring 11 and to establish a point of rotation to contain the reeling action.

According to further aspects of the present invention cable reel 100, both spool halves 6, 9 are preferably designed to assure they can be assembled in only one orientation. The powerspring 11 is kept in place and contained in a powerspring housing 10 that is directly connected to the base housing 12. The base housing 12 also has mounting points for indexing dog 4 and its spring. The indexing dog 4 is critical to the spool alignment and mating of the contacts 14 and pads 15 in the connection phase of operation.

Before the connection can be made, the spool PCB 5 is precisely aligned with the stationary PCB 3. This is done by interfacing the indexing dog 4 and the index housing 16. When this interaction takes place, the indexing dog 4 not only serves to lock the spool 6, 9 in place and properly align the two PCBs 3, 5, it also is pushed back to engage the mating lever 2. The mating lever 2 and the indexing dog 4 both have nipples 18, 19 on their surface that precisely engage to produce the requisite force to bring the stationary PCB 3 toward the spool PCB 5 forcing the two together facilitating the connection.

According to yet further aspects of the present invention, disconnection occurs when the user pulls on the cable 7 to begin the retraction process. The pulling action is illustrated by directional arrow 27 in FIG. 1. The slightest movement of the spool due to the increased tension on the cable causes an immediate disengagement of the indexing dog 4 and the mating lever 2 relieving the force that keeps the contacts together. If the tension is then released without further spool rotation, the engagement process will repeat itself and the electronic connection will then be reestablished. Should the user pull a little harder to completely disengage the indexing dog 4 from the index housing 16, the spool 6, 9 will freewheel and allow the cable to retract unencumbered.

While the preferred embodiment of the invention has been illustrated and described, as noted above, many changes can be made without departing from the spirit and scope of the invention. For example, the size, shape, cable type, industry application, number of contacts, PCB design and contact layout may vary from the specific examples and embodiments described herein. Accordingly, the scope of the invention is not limited by the disclosure of the preferred embodiment. Instead, the invention should be determined entirely by reference to the claims that follow.

The embodiments of the invention 100 in which an exclusive property or privilege is claimed are defined as follows:

What is claimed is:

1. A retractable reel apparatus for high quality signal and data transfer via cable or cord comprising:

a housing comprising first electrical contacts;

a spool assembly coupled to and in rotatable communication with the housing for extension and retraction of a cable, the spool assembly comprising second electrical contacts; and a device for aligning and locking the spool assembly in a prescribed position, wherein the device being configured to make an electrical connection of the first and second electrical contacts once the spool assembly is locked and in response to a pulling action on the cable enabling extension and retraction of the cable, the electrical connection of the first and second electrical contacts is broken and the spool assembly is unlocked, wherein the device for aligning and locking the spool assembly, further comprises [at least one of the group of] an index housing[, an indexing dog, and a mating lever, and wherein the index housing interfaces with the indexing dog to lock the spool assembly in place and provides lateral forces to engage the indexing dog with the mating lever.]*; and*

*wherein the cable is attached to a spool PCB and is capable of unwinding and rewinding on the spool assembly.*

2. The apparatus of claim 1, wherein the spool assembly being configured to rotate when there is no electrical connection of the first and second electrical contacts.

3. The apparatus of claim 1, wherein electrical disconnection of the first and second electrical contacts being configured to occur immediately prior to unlocking of the spool assembly.

4. The apparatus of claim 1, wherein the [cable is attached to a spool PCB and is capable of unwinding and rewinding on the spool assembly] *retractable reel apparatus for high quality signal and data transfer via cable or cord is scalable.*

5. The apparatus of claim 1, wherein the cable being configured to extend from the housing and retract into the housing on the spool assembly when the electrical connection of the first and second electrical contacts is broken.

6. The apparatus of claim 1, wherein the cable is capable of passing a [high integrity] signal.

7. The apparatus of claim 1, wherein the electrical connection does not occur unless the device for locking the spool assembly is aligned and locked.

8. The apparatus of claim 1, wherein indexing of the device for locking the spool assembly and the electrical connection of the first and second electrical contacts being configured to occur when a user extends the cable to a desired position.

9. The apparatus of claim 3, wherein the first and second electrical contacts are disconnected and unlocking being configured to occur when a user extends the cable.

10. The apparatus of claim [4] *1*, wherein the electrical connection being configured to occur when a stationary PCB is brought together to make contact with the spool PCB.

11. The apparatus of claim 10, wherein a mating lever provides force to bring the two PCBs together.

12. The apparatus of claim 11, wherein the mating lever receives the force to bring the two PCBs together from the interaction with an indexing dog.

*13. The apparatus of claim 1, wherein the index housing interfaces with an indexing dog to lock the spool assembly in place.*

*14. The apparatus of claim 1, wherein the index housing provides lateral forces to engage an indexing dog with a mating lever.*

* * * * *